United States Patent
Shakhnovich

(10) Patent No.: US 7,300,504 B2
(45) Date of Patent: Nov. 27, 2007

(54) INKJET INKS AND METHODS OF PREPARING THE SAME

(75) Inventor: Alexander I. Shakhnovich, Westford, MA (US)

(73) Assignee: Cabot Corporation, Boston, MA (US)

( * ) Notice: Subject to any disclaimer, the term of this patent is extended or adjusted under 35 U.S.C. 154(b) by 51 days.

(21) Appl. No.: 10/689,268

(22) Filed: Oct. 20, 2003

(65) Prior Publication Data

US 2005/0081749 A1    Apr. 21, 2005

(51) Int. Cl.
*C09D 11/02* (2006.01)
(52) U.S. Cl. .................................... 106/31.6
(58) Field of Classification Search ............... 106/31.6
See application file for complete search history.

(56) References Cited

U.S. PATENT DOCUMENTS

| | | | |
|---|---|---|---|
| 3,725,101 A | 4/1973 | Kuhne et al. | 106/288 Q |
| 3,759,731 A | 9/1973 | Kuhne et al. | 106/288 Q |
| 3,759,733 A | 9/1973 | Gordon et al. | 106/309 |
| 4,334,932 A | 6/1982 | Roueche | 524/191 |
| 4,474,609 A | 10/1984 | Ehl et al. | 106/288 Q |
| 5,062,894 A | 11/1991 | Schwatrz et al. | 106/23 |
| 5,086,168 A * | 2/1992 | Rieper | 534/579 |
| 5,145,997 A | 9/1992 | Schwartz et al. | 564/158 |
| 5,246,494 A * | 9/1993 | Platman et al. | 106/496 |
| 5,559,216 A | 9/1996 | Jung et al. | 534/579 |
| 5,837,045 A * | 11/1998 | Johnson et al. | 106/31.85 |
| 6,136,087 A | 10/2000 | Kapoor | 106/496 |
| 6,451,103 B1 | 9/2002 | Uemura et al. | 106/493 |
| 6,478,863 B2 * | 11/2002 | Johnson et al. | 106/31.6 |
| 6,506,245 B1 * | 1/2003 | Kinney et al. | 106/493 |
| 6,692,559 B2 | 2/2004 | Ishigami et al. | 106/31.8 |
| 6,863,713 B1 * | 3/2005 | Ghosal et al. | 95/117 |
| 2001/0029870 A1 | 10/2001 | Uemura et al. | 106/31.65 |
| 2004/0163569 A1 * | 8/2004 | Shakhnovich | 106/31.8 |

FOREIGN PATENT DOCUMENTS

| | | |
|---|---|---|
| EP | 0 546 857 | 12/1992 |
| EP | 1 316 588 | 6/2003 |
| EP | 1 666 547 | 6/2006 |
| GB | 1 356 253 | 6/1974 |
| GB | 2 356 866 | 6/2001 |

OTHER PUBLICATIONS

International Search Report and Written Opinion for International Application No. PCT/US04/034328.
JP05-070725 to Dainichiseika Color and Chem. Mfg. Co. LTD, Mar. 23, 1993 Abstract only (from Patent Abstracts of Japan).
JP 2002-338845 to Toyo Ink Mfg. Co. LTD, Nov. 27, 2002 Abstract only (from Patent Abstracts of Japan).

\* cited by examiner

*Primary Examiner*—J. A. Lorengo
*Assistant Examiner*—Veronica Faison-Gee

(57) ABSTRACT

Inkjet ink compositions comprising a liquid vehicle and a modified azo pigment are described. The modified azo pigment comprises the reaction product of at least one diazonium reagent and at least one azo coupler. At least one of the diazonium reagents and/or azo couplers may comprise at least one ionic group, ionizable group, or mixture thereof or at least one alkylene oxide group. The inkjet ink composition does not include a separate dispersant which primarily functions to obtain or maintain stability of the modified azo pigment or the ink jet ink composition. Methods of preparing the inkjet ink compositions are also described.

24 Claims, 2 Drawing Sheets

INKJET INKS AND METHODS OF PREPARING THE SAME

BACKGROUND OF THE INVENTION

1. Field of the Invention

The present invention relates to inkjet ink compositions comprising modified azo pigments and methods of preparing inkjet ink compositions.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants for an aqueous medium include water-soluble polymers and surfactants.

Azo pigments are a specific class of colored pigments, generally falling in the yellow, orange, or red color space. These pigments are typically prepared by mixing a diazonium salt (the diazo component) with a compound capable of reacting with a diazonium salt (the azo coupling component). The type and substituents on each component determine the pigments color and brightness.

Dispersions of azo pigments have been prepared using a variety of different techniques, both physical (such as milling) as well as chemical. For example, azo pigment dispersions have been prepared using dispersants having a structural unit similar if not identical to the chemical unit of the colored pigment. For example, GB2356866 discloses a bis-azo compound derived from diazotized (carboxy/sulfo)-anilines and 1,4-bis(acetoacetamido)phenylenes and their use in pigment and ink compositions. These materials were found to be particularly useful in combination with yellow or orange pigments having nearly the identical structure. GB2356634 describes very similar mono-azo compounds for the same use. GB2364322 describes N-(sulfophenyl)-alpha-(2-methoxy-4-nitrophenylazo) acetacetamides for use with monoazo pigments, particularly yellow pigments.

Other methods of controlling the dispersibility of colored pigments are also known. For example, International Patent Application No. WO00/26304 discloses the preparation of a crystal growth inhibitor that controls the amount of crystallinity developed during the process of preparing a colored pigment and prevents recrystallization of dispersed pigments. The crystal growth inhibitor is prepared using a process similar to the known process for preparing the pigment (for example, by the reaction of a diazonium salt with an azo coupling agent), and can also be prepared in situ during the preparation of the colored pigment. Also, in U.S. Pat. No. 6,451,103, water soluble pigment derivatives, which are pigments further substituted with an acidic functional group or salt, are used to prepare aqueous dispersions of that specific pigment. Inkjet inks are also disclosed.

Dispersions of azo pigments prepared using mixtures of azo couplers or mixtures of diazonium reagents have also been described. For example, EP 1 316 588 A2 describes the preparation of a pigment yellow 74 which is obtainable by coupling a diazo component and a coupler component. The coupler component comprises 2-methoxyacetoacetoanilide and an acetoacetoanilide derivative having a defined formula which can be substituted with a COOH or $SO_3H$ group. A similar approach using mixtures of diazo components having these substituents is also described. Printing inks are also disclosed.

In general, the approaches described for preparing azo pigment dispersions also include the addition of a dispersant or dispersing agent to provide stability to the dispersion. For example, the azo pigments described in EP 1 316 588 A2 also contain rosin soap, which is used as a dispersing agent, to provide a useful printing ink. However, the use of additional components to provide pigment dispersion stability may be undesirable if the presence of the additional component effects the overall performance of the ink composition, including viscosity and print performance. In addition, the use of a separate dispersing agent such as rosin soap is also expected to have detrimental effects on ink formulation flexibility. This is particularly true for use in an aqueous inkjet ink composition.

Therefore, there remains a need for methods of preparing inkjet ink compositions comprising azo pigments, particularly those which do not contain added dispersants or dispersing agents.

SUMMARY OF THE INVENTION

The present invention relates to an inkjet ink composition comprising a) a liquid vehicle and b) a modified azo pigment. In one embodiment, the modified azo pigment is the reaction product of at least one first diazonium reagent, at least one second diazonium reagent, and at least one azo coupler. The first diazonium reagent or the second diazonium reagent may comprise at least one ionic group, at least one ionizable group, or a mixture of at least one ionic group and at least one ionizable group, or may comprise at least one alkylene oxide group. In a second embodiment, the modified colored pigment is the reaction product at least one diazonium reagent, at least one first azo coupler, and at least one second azo coupler. The first azo coupler or the second azo coupler may comprise at least one ionic group, at least one ionizable group, or a mixture of at least one ionic group and at least one ionizable group, or may comprise at least one alkylene oxide group. For both embodiments, the inkjet ink composition does not include a separate dispersant which primarily functions to obtain or maintain stability of the modified azo pigment or the ink jet ink composition. Preferably the liquid vehicle is an aqueous vehicle such as water and the inkjet ink composition is an aqueous inkjet ink composition.

The present invention further relates to a method of preparing an inkjet ink composition. In one embodiment, the method comprises the steps of: a) combining, in any order, at least one first diazonium reagent, at least one second diazonium reagent, and at least one azo coupler to form a slurry comprising a modified azo pigment; b) filtering the slurry to form a modified azo pigment presscake; c) adding an aqueous vehicle to the presscake under high shear conditions to form a modified azo pigment dispersion; and d) optionally adding at least one additional component to the dispersion to form the inkjet ink composition. In a second embodiment, the method comprises the steps of: a) combining, in any order, at least one diazonium reagent, at least one first azo coupler, and at least one second azo coupler to form a slurry comprising a modified azo pigment; b) filtering the slurry to form a modified azo pigment presscake; c) adding an aqueous vehicle to the presscake under high shear conditions to form a modified azo pigment dispersion; and d) optionally adding at least one additional component to form the inkjet ink composition. For both embodiments, no separate dispersant which primarily functions to obtain or maintain stability of the modified azo pigment is added to the modified azo pigment dispersion of step (c) or the inkjet ink composition of step (d).

It is to be understood that both the foregoing general description and the following detailed description are exemplary and explanatory only and are intended to provide further explanation of the present invention, as claimed.

BRIEF DESCRIPTION OF THE DRAWING

In FIG. 1a, the second diazonium reagent is added after the first diazonium reagent is consumed. In FIG. 1b, the second diazonium reagent is added prior to complete reaction of the first diazonium reagent.

DETAILED DESCRIPTION OF THE INVENTION

Figure 1A:
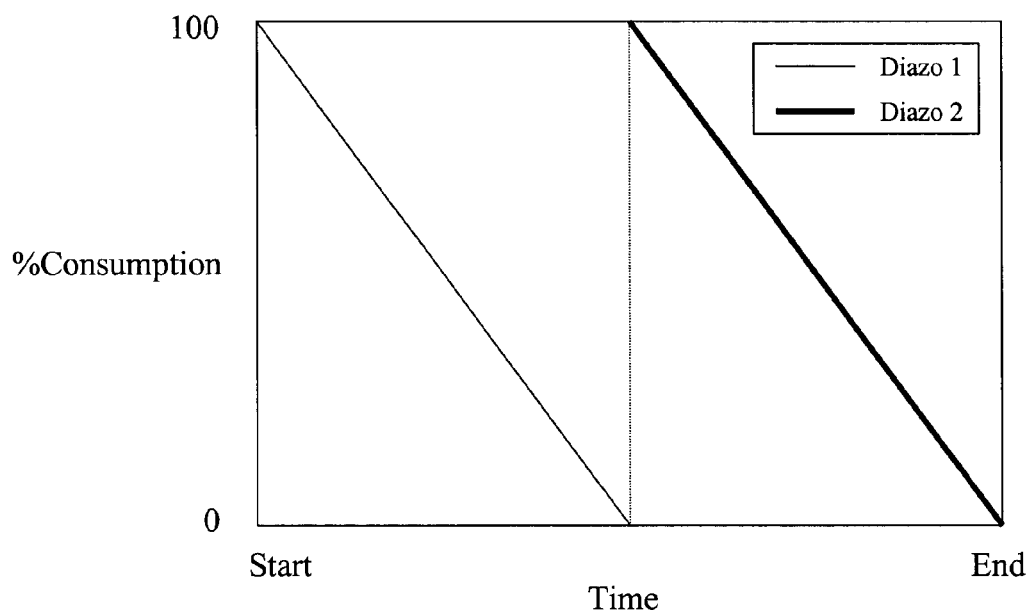
FIG. 1a and FIG. 1b show examples of addition schedules for the method of the present invention.

The present invention relates to inkjet ink compositions and methods of preparing the same.

The inkjet ink compositions of the present invention comprise a liquid vehicle and a modified azo pigment. The vehicle can be either an aqueous or non-aqueous liquid vehicle, but is preferably a vehicle that contains water. Thus, the vehicle is preferably an aqueous vehicle, which can be, for example, water or mixtures of water with water miscible solvents such as alcohols. Preferably the aqueous vehicle is water, and the inkjet ink composition is an aqueous inkjet ink composition.

The modified azo pigment of the inkjet jet ink compositions of the present invention is the reaction product of at least one diazonium reagent and at least one azo coupler. The diazonium reagent (also sometimes referred to as the diazo compound) is an organic compound comprising at least one $N_2^+$ group. Preferably, the diazonium reagent comprises an aromatic or heteroaromatic group and is therefore an aryl or heteroaryl diazonium reagent. The azo coupler is an organic compound having at least one nucleophilic group capable of reacting with an $N_2^+$ group. Preferably, the azo coupler comprises an acetoacetamide group or a 2-hydroxynaphthalene-3-carboxamide group. The diazonium reagent reacts with the azo coupler to form an azo colorant species, which is the building block for the modified azo pigment.

For the present invention, at least one of the diazonium reagents, at least one of the azo couplers, or both may comprise at least one ionic group, at least one ionizable group, or a mixture thereof. An ionic group is either anionic or cationic and is associated with a counterion of the opposite charge including inorganic or organic counterions such as $Na^+$, $K^+$, $Li^+$, $NH_4^+$, $NR'_4{}^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Organic ionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include —COO⁻, —SO₃⁻, —OSO₃⁻, —HPO₃⁻, —OPO₃⁻², and —PO₃⁻². Representative examples of anionizable groups include —COOH, —SO₃H, —PO₃H₂, —R'SH, —R'OH, and —SO₂NHCOR', where R' represents hydrogen or an organic group such as a substituted or unsubstituted aryl and/or alkyl group. Preferably, the anionic or anionizable group is a carboxylic acid group, an alkylsulfate group, or salts thereof.

Cationic groups are positively charged organic ionic groups that may be generated from ionizable substituents that can form cations (cationizable groups), such as protonated amines. For example, alkyl or aryl amines may be protonated in acidic media to form animonium groups —NR'₂H⁺, where R' represent an organic group such as a substituted or unsubstituted aryl and/or alkyl group. Preferably, the cationic or cationizable group is an amine group or salt thereof or an animonium group, and more preferably is a benzylamine, phenethylamine, phenyleneamine, or aminoalkylamine group such as an —SO₂-ALK1-NH-ALK2-NH2 group, wherein ALK1 and ALK2, which can be the same or different, are C2-C8 alkylene groups.

At least one of the diazonium reagents, the azo coupler, or both may may also be a polymeric group comprising one or more non-ionic groups. Examples include alkylene oxide groups of from about 1 to about 12 carbons and polyols. Examples of preferred alkylene oxide groups include, but are not limited to, —CH₂—CH₂—O—; —CH(CH₃)—CH₂—O—; —CH₂—CH(CH₃)—O—, —CH₂CH₂CH₂—O—, or combinations thereof. These non-ionic groups may further comprise at least one nucleophilic or electrophilic group, such as an —OH group, or they may be capped and thereby non-reactive.

The diazonium reagent, the azo coupler, or both may further comprise at least one reactive group. This reactive group can comprise either a nucleophilic group or an electrophilic group, depending on the nature of the reagent it is being reacted with. Thus, for example, the nucleophilic or electrophilic group may be a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, or salts and derivatives thereof. Preferably the reactive group is a group which is stable to the conditions used to form the azo pigment, including formation of the diazonium reagent.

The reactive group may comprise at least one ionic or ionizable group. Since, as discussed above, the diazonium reagent, the azo coupler, or both comprise at least one ionic or ionizable group, the ionic or ionizable group may therefore also be a reactive group. Examples of preferred ionic or ionizable reactive groups include alkyl sulfate groups (such as a (2-sulfatoethyl)-sulfone group), and amino groups (such as a benzylamine group).

In one embodiment of the present invention, the inkjet ink composition comprises a modified azo pigment which is the reaction product of at least one first diazonium reagent, at least one second diazonium reagent, and at least one azo coupler. Thus, the modified azo pigment is the reaction product of two different types of diazonium reagents and one type of azo coupler. The first diazonium reagent may be any diazonium reagent described above and is preferably an aromatic diazonium reagent. The second diazonium reagent is different from the first diazonium reagent and comprises at least one ionic group, at least one ionizable group, or a mixture thereof. Preferred are aromatic diazonium reagents substituted with at least one ionic and/or ionizable group. These groups may be anionic or cationic and may be any of those described above. Alternatively, the first diazonium reagent may comprise at least one ionic group, at least one ionizable group, or a mixture thereof. In this situation, the second diazonium reagent, which is different from the first, may be any diazonium reagent described above and is preferably an aromatic diazonium reagent. The azo coupler can be any coupler described above. Preferably, one of the diazonium reagents does not comprise an ionic or ionizable group, other than the diazo functional group present, while the other one does. More preferably, the azo coupler also does not comprise an ionic or ionizable group, other than the nucleophilic group present, if such a group is ionic or ionizable. Thus, in a preferred embodiment, the modified azo pigment is the reaction product of at least one conventional diazonium reagent, at least one substituted or functionalized diazonium reagent, and at least one conventional azo coupler.

In a second embodiment of the present invention, the inkjet ink composition comprises a modified azo pigment which is the reaction product of at least one diazonium reagent, at least one first azo coupler, and at least one second azo coupler. Thus, the modified azo pigment is the reaction product of two types of azo couplers and one type of diazonium reagent. The diazonium reagent can be any of those described above. The first azo coupler can be any coupler described above. The second azo coupler is different from the first azo coupler and comprises at least one ionic group, at least one ionizable group, or a mixture thereof. Alternatively, the second azo coupler can be any coupler described above and the first azo coupler comprises at least one ionic group, at least one ionizable group, or a mixture thereof. In either case, the group may be anionic or cationic and can be any of those described above. Preferably, one of the azo couplers does not comprise an ionic or ionizable group, other than the nucleophilic group present, if this group is ionic or ionizable, while the other one does. More preferably, the diazonium reagent also does not comprise an ionic or ionizable group, other than the diazo group present. Thus, in a preferred embodiment, the modified azo pigment is the reaction product of at least one conventional diazonium reagent, at least one conventional azo coupler, and at least one substituted or functionalized azo coupler.

In another embodiment of the present invention, the inkjet ink composition comprises a modified azo pigment which is the reaction product of at least one diazonium reagent and at least one azo coupler, wherein both the diazonium reagent and the azo coupler comprise at least one ionic group, at least one ionizable group, or a mixture thereof. The diazonium reagents, azo couplers, and ionic or ionizable groups can be any of those described in more detail above.

For each of the embodiments of the present invention, the amounts of each component can be varied in order to produce inkjet ink compositions having desired properties. Preferably, the total molar amount of diazonium reagent is approximately equal to the total molar amount of azo coupler. Thus, the diazonium reagent and azo coupler are used in stoichiometric amounts. In addition, when either two different types of diazonium reagents or two different types of azo couplers are used, the relative amounts of each can vary. The amounts will depend on a variety of factors, including azo pigment type and desired inkjet ink properties. For example, for the first embodiment of the inkjet ink composition of the present invention, the ratio of the amount of the first diazonium reagent to the second diazonium reagent may be from about 99:1 to about 1:99. Preferably, the amount of the second diazonium reagent is less than the amount of the first diazonium reagent. Similar amounts apply for the second embodiment.

The modified azo pigments may be purified by washing, such as by filtration, centrifugation, or a combination of the two methods, to remove unreacted raw materials, byproducts and other reaction impurities. The products may also be isolated, for example, by evaporation or it may be recovered by filtration and drying using techniques known to those skilled in the art. The resulting wet cake pigment, also sometimes referred to as a presscake, can then be redispersed, such as under high shear conditions, to form modified pigment dispersions which are then used to form the inkjet ink compositions. This is discussed in more detail below.

The modified azo pigments can be used in the inkjet ink compositions of the present invention in an amount effective to provide the desired image quality (for example, optical density) without detrimentally affecting print performance. Preferably the pigment is incorporated in the liquid vehicle to form an inkjet ink composition and is present in an amount ranging from about 0.1% to about 20%, most preferably 1% to 5%, based on the weight of the inkjet ink composition. It is also within the bounds of the present invention to use a formulation containing a mixture of modified azo pigments described herein and either unmodified azo pigments or other modified pigments (such as those described in, for example, U.S. Pat. Nos. 5,851,280, 5,698,016, 5,922,118, and 5,837,045, and PCT Publication Nos. WO 99/51690, WO 00/22051, and WO 01/51566, the descriptions of which are fully incorporated herein by reference). Combinations may also be used.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions of the present invention can be formed with a minimum of additional components (additives and/or cosolvents). Suitable components may be incorporated into these inkjet ink compositions to impart a number of desired properties while maintaining the stability of the compositions. These components additives are well known in the art and include humectants, biocides, binders, drying accelerators, penetrants, surfactants, and the like. The amount of a particular component or additive will vary depending on a variety of factors but are generally present in an amount ranging between 0% and 40%.

While it is recognized that optional components or additives that are typically used in the final formulation of an inkjet ink composition may be used, an important and surprising aspect of the present invention is that no additional or separate external dispersing agents or dispersants are required in order to produce a stable dispersion of the modified azo pigment in the inkjet ink composition of the present invention. By stable is meant that no substantial increase in particle size, including pigment agglomeration or flocculation, is observed at a specified temperature (such as from about 0° C. to about 100° C., including room temperature) over a period of time (such as several weeks to several months). As used herein, a dispersing agent or dispersant is a component that is added separately to the modified azo pigment or inkjet ink composition in order to obtain and/or maintain a stable dispersion of the modified azo pigment in the ink composition. Therefore, the present invention relates to an inkjet ink composition comprising a liquid vehicle and a modified azo pigment, as described above, without the separate addition of a dispersing agent or dispersant. While it is within the scope of the present invention to include various additives that are commonly used in inkjet ink compositions into the inkjet ink compositions of the present invention in order to adjust or obtain various print and/or physical properties, these additives are optional ingredients for ink formulation flexibility and are not required to obtain and/or maintain the stability of the modified azo pigment dispersed in the inkjet ink composition. Similarly, it is recognized that such additives may be found to improve one or more desirable print and/or physical properties of the ink composition while also having a secondary beneficial effect on pigment stability. For example, additives may be used which reduce the particle size and/or further enhance the stability of the modified azo pigment dispersion or inkjet ink composition. However, unlike the compositions of the prior art, the inkjet ink compositions of the present invention do not require the separate addition of a dispersion agent or dispersant which primarily functions to provide stability to the modified azo pigment dispersion or inkjet ink composition. This is exemplified in the present invention by the fact that the modified azo pigment is self-dispersing in a liquid vehicle to form a stable modified azo pigment dispersion containing no separately added dispersant or dispersing agent. Such dispersion can then be used for preparing the inkjet ink compositions. This is described in more detail below. Therefore, although an ink formulator may use additional components to enhance print properties or performance, and such components may have a secondary beneficial effect on pigment stability, such dispersing agents or dispersants are not required for stability.

The inkjet ink compositions may be purified or classified to remove impurities and other undesirable free species which can co-exist in the inkjet ink composition as a result of the manufacturing process. For example, the inkjet ink composition can be purified to remove any undesired free species, such as unreacted reagents used to prepare the modified azo pigment. Known techniques of ultrafiltration/diafiltration using a membrane or ion exchange may be used to purify the dispersion and remove a substantial amount of free ionic and unwanted species. Since the modified azo pigment comprises ionic and/or ionizable groups, at least some of which are at the pigment surface, an optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$.

The present invention further relates to inkjet ink compositions and methods of preparing inkjet ink compositions. The method comprises the steps of combining at least one diazonium reagent and at least one azo coupler to form a pigment slurry, filtering the slurry to form a modified pigment presscake, and adding water to the presscake under high shear conditions. The diazonium reagent and azo coupler can be combined in any order and in any suitable vessel. The components are combined under conditions typically used for forming an azo pigment, including temperatures generally from about 0° C. to about 50° C. In addition, base may be added to further facilitate the reaction of the components. Examples of bases include hydroxide reagents (such as sodium hydroxide, potassium hydroxide, or ammonium hydroxide) and amines (such as triethylamine or pyridine).

As described in more detail above, the reagents can be used in any relative amounts, but preferably the azo coupler is used in a stoichiometric amount to the total amount of the diazonium reagent. In this way, all of the reagents are consumed, which reduces the need for excessive purification of the modified azo pigment and/or inkjet ink composition.

In one embodiment, the method of the present invention comprises the step of combining at least one first diazonium reagent, at least one second diazonium reagent, and at least one azo coupler. The first diazonium reagent and the second diazonium reagent are not the same. The second diazonium reagent comprises at least one ionic group, ionizable group, or mixture thereof. The components may be combined in any order and can be used in any amounts, as described above. For example, the first diazonium reagent and the second diazonium reagent may be combined to form a mixture of diazonium reagents, and the resulting mixture may then be combined with the azo coupler, in any order. Alternatively, the first diazonium reagent may be combined with the azo coupler, followed by the addition of the second diazonium reagent. If the total molar amount of diazonium reagent is approximately equivalent to the total molar amount of azo coupler, this order of addition initially produces a mixture of azo pigment and remaining azo coupler. The unreacted azo coupler is then available for reaction with the second diazonium reagent.

Figure 1B:
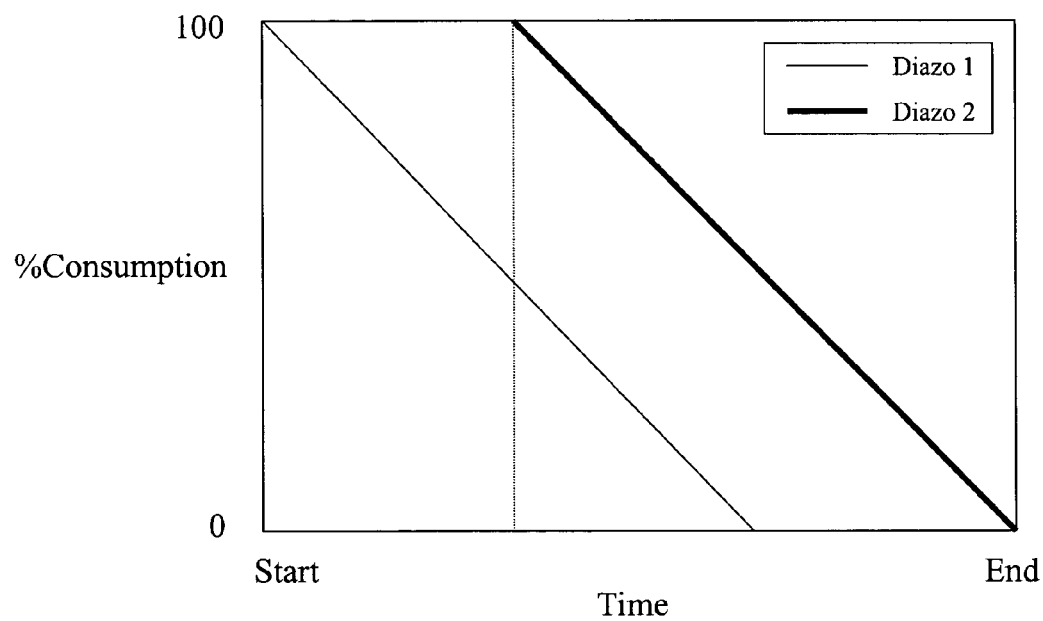

The second diazonium reagent may also be added prior to the complete reaction of the first diazonium reagent. As is known in the art, when the first diazonium reagent is combined with the azo coupler, the formation of azo pigment begins. The second diazonium reagent may be added any time before or after the formation of pigment is completed. For example, the second diazonium reagent may be added after the reaction of the first diazonium reagent is approximately 25%, 50%, 75%, or even 95% complete. The addition may also occur after the first diazonium reagent is completely consumed. Examples of addition schedules are shown in FIGS. 1a and 1b. Each figure shows the consumption of the first diazonium reagent and the timing of the addition of the second diazonium reagent. In FIG. 1a, the second diazonium reagent is added after the first diazonium reagent is consumed. In FIG. 1b, the second diazonium reagent is added prior to complete reaction of the first diazonium reagent. In this case, the reaction is approximately 50% complete.

In a second embodiment, the method of the present invention comprises the step of combining at least one diazonium reagent, at least one first azo coupler, and at least one second azo coupler. The first azo coupler and the second azo coupler are not the same. The second azo coupler comprises at least one ionic group, ionizable group, or mixture thereof. As with the first embodiment of the method described above, the components can be combined in any order and can be used in any amounts. For example, the first and second azo couplers may be combined to form a mixture which is then combined with the diazonium reagent or the first azo coupler may be combined with the diazonium reagent to form an azo pigment containing unreacted diazonium reagent, followed by the addition of the second azo coupler. The second azo coupler may be added at any time during the reaction of the first azo coupler and the diazonium reagent, and addition schedules similar to those shown in FIGS. 1a and 1b may be used.

The diazonium reagent and azo coupler are combined in a liquid medium to form a pigment slurry. The liquid medium may be the same or different as the liquid vehicle of the inkjet ink compositions described above. Preferably the liquid medium is an aqueous medium, such as water.

The slurry is then filtered to produce a presscake of modified azo pigment. Filtration may occur using any equipment known in the art. The resulting presscake can be dry but typically contains a relatively low amount of remaining liquid medium, such as water. The wet presscake may contain up to about 5% or more liquid medium, such as about 10%, about 15%, or about 20% liquid medium.

Water is then added to the presscake under high shear conditions to produce an aqueous dispersion of the modified azo pigment. This can be done in any equipment capable of providing high shear mixing conditions. Such equipment is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like. Thus, as used herein for the method of the present invention, "high shear conditions" means mixing conditions having sufficient energy to produce an intimate mixture of the modified azo pigment and water. The high shear mixers may be either batch, semi-continuous, or continuous mixers. A continuous mixer offers both economic and practical advantages to batch processing equipment and would be generally preferred.

The method of the present invention may further comprise the incorporation of suitable additives into the inkjet ink compositions to impart a number of desired properties while maintaining the stability of the compositions. However, as discussed in more detail above, an important and surprising aspect of the method of the present invention is that separate dispersing agents do not need to be added in order to produce inkjet ink compositions. Thus, while it is within the scope of the present invention to incorporate additives in order to adjust or obtain inkjet ink compositions with various print or physical properties, these steps are optional for ink formulation flexibility and are not required to obtain inkjet ink compositions with good overall properties.

The present invention will be further clarified by the following examples which are intended to be only exemplary in nature.

EXAMPLES

Example 1

This example demonstrates an embodiment of the present invention in which a mixture of diazonium reagents is combined with an azo coupler.

A mixture of 14.62 g (0.095 mol) of 2-anisidine, 0.86 g (0.05 mol) of 4-aminobenzoic acid, 25 mL of 37% hydrochloric acid (approx. 0.3 mol HCl), and 150 mL of water was stirred for 30 minutes and cooled to 5° C. in an ice bath. A solution of 7.1 g (0.103 mol) of sodium nitrite in 30 mL of water was added dropwise while maintaining the temperature between 5 and 10° C. The mixture was stirred for 30 minutes, and the excess nitrous acid was destroyed by addition of 1 g of sulfamic acid. The resulting mixture of diazonium reagents was kept in an ice bath prior to coupling.

A mixture of 23.3 g (0.1 mol) of 5-acetoacetamidobenzimidazolone, 130 mL of 1N sodium hydroxide solution, and 0.5 ml of Aromox® C/12 (available from Akzo Nobel as a mixture of bis(2-hydroxyethyl)cocoalkylamine oxides) was gently heated while stirring until complete dissolution was observed. This solution was added to 300 g of ice, followed by reprecipitation of the azo coupler as a fine dispersion by addition of 6 mL (0.1 mol) of acetic acid. After that, about 25 g of anhydrous sodium acetate was added for buffering.

The mixture of diazonium reagents was added dropwise under intensive stirring to the dispersion of azo coupler. The temperature was maintained at 10-15° C., and the pH was maintained at 4.5-5.5 by dropwise addition of 1N sodium hydroxide solution. After complete addition, the mixture was stirred for an additional hour, after which no diazonium reagent could be detected by a spot check with R-salt (2-naphtol-3,6-disulphonate) or 5-aminosalycilic acid. The mixture was then heated to 80-90° C. for 30 minutes and finally cooled to 70° C. The resulting yellow precipitate of the modified Pigment Yellow 194 azo pigment was filtered off and washed thoroughly with water until the conductivity of the filtrate was as low as 200 μsiemens.

The wet presscake was transferred to a stainless steel beaker containing 500 mL of DI water and mixed under high shear conditions using a Silverson L4RT-A rotor-stator high shear mixer for 10 minutes. After this time, the pH was carefully adjusted with 1N NaOH to 7.5 and mixing continued for additional 2 hours. A dispersion of a bright yellow modified azo pigment was obtained having a median particle size of approximately 333 nm.

This dispersion was transferred to a UIP2000 flow-through sonicator and sonicated at 1.2 kW power setting for 120 min. The median particle size was found to be approximately 179 nm. The dispersion was concentrated using a 50 nm diafiltration column to a solids content of 6.2%. The dispersion yield was approximately 60%. No particle growth was observed for several weeks at 70° C., indicating the formation of a stable pigment dispersion without any separately added dispersant.

Example 2

This example further demonstrates an embodiment of the present invention in which a mixture of diazonium reagents is combined with an azo coupler.

A mixture of 15.96 g (0.095 mol) of 4-nitro-2-anisidine, 0.866 g (0.05 mol) of sulfanilic acid, 25 mL of 37% hydrochloric acid (approx. 0.3 mol HCl), and 100 mL of water was stirred for 30 minutes and cooled to 5° C. in an ice bath. A solution of 7.1 g (0.103 mol) of sodium nitrite in 30 mL of water was added dropwise while maintaining the temperature between 5 and 10° C. The mixture was stirred for 30 minutes, and the excess nitrous acid was destroyed by addition of 1 g of sulfamic acid. The resulting mixture of diazonium reagents was kept in an ice bath prior to coupling.

A mixture of 20.7 g (0.1 mol) of acetoacet-o-anisidide and 130 mL of 1N sodium hydroxide solution was gently heated while stirring until complete dissolution was observed. This solution was then added to 500 g of ice, followed by reprecipitation of the azo coupler as a fine dispersion by addition of 7.8 mL (0.13 mol) of acetic acid. After that, about 25 g of anhydrous sodium acetate was added for buffering.

The mixture of diazonium reagents was added dropwise under intensive stirring to the azo coupler dispersion. The temperature was maintained at 10-15° C., and the pH was maintained at 4.5-6.5 by dropwise addition of 1N sodium hydroxide solution. After complete addition, the mixture was stirred for an additional hour, after which no diazonium reagent could be detected by a spot check with R-salt or 5-aminosalycilic acid. The mixture was then heated to 60° C. for 60 minutes and finally cooled to 50° C. The resulting yellow precipitate of the modified Pigment Yellow 74 azo pigment was filtered off and washed thoroughly with water until the conductivity of the filtrate was as low as 200 µsiemens.

The wet presscake was transferred to a stainless steel beaker containing 500 mL of DI water and mixed under high shear conditions using a Silverson® L4RT-A rotor-stator high shear mixer for 60 minutes. A dispersion of a bright yellow modified azo pigment was obtained having a bimodal particle size distribution of 2,200 nm and 100 nm. This dispersion was transferred to a Misonix® flow-through sonicator and sonicated at a power setting of 75 W for 90 minutes, and the resulting median particle size was approximately 200 nm.

The dispersion was centrifuged using a Beckman L80 Ultracentrifuge for 30 minutes at 5,000 rpm. The resulting median particle size was 84 nm. The dispersion was then concentrated using a 50 nm diafiltration column to a solids content of 10.0%. The dispersion yield was about 65%. No particle growth was observed for several weeks at room temperature, indicating the formation of a stable pigment dispersion without any separately added dispersant.

Example 3

This example demonstrates an embodiment of the present invention in which a first diazonium reagent is combined with an azo coupler followed by addition of the second diazonium reagent.

A mixture of 11.59 g (0.00475 mol) of 1,2-bis-(2-aminophenoxy)ethane, 20.2 mL of 37% hydrochloric acid (approx. 0.25 mol HCl), and 150 mL of water was stirred and heated to 70-90° C. until all of the amine was dissolved. The solution was then cooled to 5° C. in an ice bath to reprecipitate the hydrochloride salt of the amine as fine needles. A solution of 7.1 g (0.103 mol) of sodium nitrite in 30 mL of water was then added dropwise while maintaining the temperature between 5 and 10° C. The mixture was stirred for 30 minutes, and the excess nitrous acid was destroyed by addition of 1 g of sulfamic acid. The resulting solution of the first diazonium reagent was kept in an ice bath prior to coupling.

A mixture of 6.86 g (0.05 mol) of 4-aminobenzoic acid, 10 mL of 37% hydrochloric acid (approx. 0.25 mol HCl), and 100 mL of water was stirred for 30 minutes and cooled to 5° C. in an ice bath. A solution of 3.55 g (0.0505 mol) of sodium nitrite in 30 mL of water was added dropwise while maintaining the temperature between 5 and 10° C. The mixture was stirred for 30 minutes, and the excess nitrous acid was destroyed by addition of 1 g of sulfamic acid. The resulting solution of the second diazonium reagent was kept in an ice bath prior to coupling. This was diluted to 250 mL with DI water, and a 10% aliquot was used as the second diazonium reagent for coupling.

A mixture of 23.3 g (0.1 mol) of 5-acetoacetamidobenzimidazolone, 200 mL of water, and 12 g (0.3 mol) sodium hydroxide in 100 mL of water was gently mixed for 30 minutes at room temperature until complete dissolution was observed. To this was added 125 g of ice, followed by 0.5 mL of Aromox® C/12 (Aromox is available from Akzo Nobel and is a mixture of bis(2-hydroxyethyl)cocoalkylamine oxides) as a surfactant to assist in the pigment synthesis. The azo coupler was reprecipitated as a fine dispersion by addition of 17.5 mL (0.31 mol) of acetic acid.

The solution of the first diazonium reagent was added dropwise under intensive stirring to the azo coupler dispersion. The temperature was maintained at 20° C., and the pH was maintained at 6.0 by dropwise addition of 2N sodium hydroxide solution. After complete addition, the mixture was stirred for an additional hour, after which no diazonium reagent could be detected by a spot check with R-salt or 5-aminosalycilic acid.

The solution of the second diazonium reagent was then added over 15 minutes, while maintaining the pH at 6.0. After stirring for 30 minutes at 20° C., the mixture was heated to 90° C. for 30 minutes and finally cooled to 60-70° C. The resulting yellow precipitate of the modified Pigment Yellow 180 azo pigment was filtered off and washed thoroughly with water until the conductivity of the filtrate was as low as 200 µsiemens. This also removes the remaining Aromox® C/12.

The wet presscake was transferred to a stainless steel beaker containing 800 mL of DI water and mixed under high shear conditions using a Silverson L4RT-A rotor-stator high shear mixer for 90 minutes. A dispersion of a bright yellow modified azo pigment was obtained having a median particle size around 700 nm.

This dispersion was transferred to Misonix flow-through sonicator and sonicated at a power setting of 75 W for 150 minutes, and the resulting median particle size was around 220 nm. The dispersion was then concentrated using a 50 nm diafiltration column to a solids content of 10.0%. The dispersion yield was about 65%. No particle growth was observed for several weeks at room temperature, indicating the formation of a stable pigment dispersion without any separately added dispersant.

Example 4

This example further demonstrates an embodiment of the present invention in which a mixture of diazonium reagents is combined with an azo coupler.

A mixture of 8.30 g (0.050 mol) of 4-nitro-2-anisidine, 0.61 g (0.005 mol) of 4-aminobenzylamine, 17 mL of 37% hydrochloric acid (approx. 0.2 mol HCl), and 150 mL of water was stirred for 30 minutes and cooled to 5° C. in an ice bath. A solution of 3.85 g (0.056 mol) of sodium nitrite in 30 mL of water was added dropwise while maintaining the temperature between 5 and 10° C. The mixture was stirred for 30 minutes, and the excess nitrous acid was destroyed by addition of 0.5 g of sulfamic acid. The resulting mixture of diazonium reagents was kept in an ice bath prior to coupling.

A mixture of 11.5 g (0.05 mol) of acetoacet-o-anisidide and 65 mL of 1N sodium hydroxide solution was gently heated while stirring until complete dissolution was observed. This solution was added to 200 g of ice, followed by reprecipitation of the azo coupler as a fine dispersion by addition of 3.3 mL (0.05 mol) of acetic acid.

The mixture of diazonium reagents was added dropwise under intensive stirring to the azo coupler dispersion. The temperature was maintained at 10-15° C., and the pH was maintained at 4.5-6.5 by dropwise addition of 4N sodium acetate solution. After complete addition, the mixture was stirred for additional hour, after which no diazonium reagent could be detected by a spot check with R-salt or 5-aminosalycilic acid. The mixture was then heated to 70-80° C. for 60 minutes and finally cooled to 70° C. The resulting yellow precipitate of the modified Pigment Yellow 74 azo pigment was filtered off and washed thoroughly with water until the conductivity of the filtrate was as low as 200 µsiemens.

The wet presscake was transferred to a stainless steel beaker containing 500 mL of DI water and mixed under high shear conditions using a Silverson L4RT-A rotor-stator high shear mixer for 120 minutes. A dispersion of a bright yellow modified azo pigment was obtained having a median particle size around 300 nm.

This dispersion had been transferred to Misonix flow-through sonicator and sonicated at a power setting of 75 W for 120 minutes. The median particle size was found to be approximately 120 nm. The dispersion was concentrated using a 50 nm diafiltration column to a solids content of 10.0%. The dispersion yield was about 65%. No particle growth had been observed for several weeks at room temperature, indicating the formation of a stable pigment dispersion without any separately added dispersant.

Example 5

The following example shows the use of a modified azo pigment dispersion in an inkjet ink composition.

An inkjet ink containing 5% of pigment, 19% of 2-pyrrolidone, 2.7% of 1,5-pentanediol, 2.0% of diethylene glycol monobutyl ether, 0.1% of Surfynol 465 (to adjust surface tension) and the balance of water, was prepared using the dispersion of modified azo pigment obtained in Example 3. The ink was charged into an HP cartridge #45A. Using an HP Photosmart 1000 printer, multiple printouts on Xerox 4024 and HP Premium Plus Photo Paper were obtained. The prints had excellent brilliancy, and the optical density at 400 nm was in excess of 1.3 on plain paper and was greater than 1.8 on photo paper. After 500 hr irradiation with UVA-351 lamps at 0.7 W/m$^2$, the loss of optical density was below 10%.

Inkjet ink compositions could also be prepared using the modified azo pigment dispersions of Examples 1, 2, and 4. Similar positive results would be expected.

As a result, the inkjet ink compositions as described herein have been found to produce printed images with desirable overall properties, without the use of a separate dispersant to provide pigment stability.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising a) a liquid vehicle and b) a modified azo pigment, wherein the modified azo pigment is the reaction product of at least one first diazonium reagent, at least one second diazanium reagent, and at least one azo coupler, wherein the inkjet ink composition does not include a separate dispersant which primarily functions to obtain or maintain stability of the modified azo pigment or the inkjet ink composition.

2. The inkjet ink composition of claim 1, wherein the first diazonium reagent or the second diazonium reagent comprises at least one ionic group, at least one ionizable group, or a mixture of at least one ionic group and at least one ionizable group.

3. The inkjet ink composition of claim 1, wherein the first diazonium reagent or the second diazonium reagent comprises at least one sulfonic acid group or salt thereof, at least one carboxylic acid group or salt thereof, at least one amine group, or at least one ammonium group.

4. The inkjet ink composition of claim 1, wherein the first diazonium reagent or the second diazonium reagent comprises at least one —COO$^-$, —SO$_3^-$, —OSO$_3^-$, —HPO$_3^-$, —OPO$_3^{-2}$, or —PO$_3^{-2}$ group.

5. The inkjet ink composition of claim 1, wherein the first diazonium reagent or the second diazonium reagent comprises at least one benzylamine group, phenethylamine group, phenyleneamine group, or aminoalkyl amine group.

6. The inkjet ink composition of claim 1, wherein the first diazonium reagent or the second diazonium reagent comprises at least one alkylene oxide group.

7. The inkjet ink composition of claim 1, wherein the first diazonium reagent or the second diazonium reagent comprises an aromatic group.

8. The inkjet ink composition of claim 1, wherein the azo coupler comprises an acetoacetamide group.

9. The inkjet ink composition of claim 1, wherein the azo coupler comprises a 2-hydroxynaphthalene-3-carboxamide group.

10. The inkjet ink composition of claim 1, wherein the liquid vehicle is an aqueous vehicle.

11. The inkjet ink composition of claim 10, wherein the aqueous vehicle is water.

12. An inkjet ink composition comprising a) a liquid vehicle and b) a modified azo pigment, wherein the modified colored pigment is the reaction product of at least one diazonium reagent, at least one first azo coupler, and at least one second azo coupler, wherein the inkjet ink composition does not include a separate dispersant which primarily functions to obtain or maintain stability of the modified azo pigment or the ink jet ink composition.

13. The inkjet ink composition of claim 12, wherein the first azo coupler or the second azo coupler comprises at least one ionic group, at least one ionizable group, or a mixture of at least one ionic group and at least one ionizable group.

14. The inkjet ink composition of claim 12, wherein the first azo coupler or the second azo coupler comprises at least one sulfonic acid group or salt thereof, at least one carboxylic acid group or salt thereof, at least one amine group, or at least one ammonium group.

15. The inkjet ink composition of claim 12, wherein the first azo coupler or the second azo coupler comprises at least one —COO$^-$, —SO$_3^-$, —OSO$_3^-$, —HPO$_3^-$, —OPO$_3^{-2}$, and —PO$_3^{-2}$ group.

16. The inkjet ink composition of claim 12, wherein the first azo coupler or the second azo coupler comprises at least one benzylamine group, phenethylamine group, phenyleneamine group, or aminoalkyl amine group.

17. The inkjet ink composition of claim 12, wherein the first azo coupler or the second azo coupler comprises at least one alkylene oxide group.

18. The inkjet ink composition of claim 12, wherein the first azo coupler or the second azo coupler comprises an acetoacetamide group.

19. The inkjet ink composition of claim 12, wherein the first azo coupler or the second azo coupler comprises a 2-hydroxynaphthalene-3-carboxamide group.

20. The inkjet ink composition of claim 12, wherein the diazonium reagent comprises an aromatic group.

21. The inkjet ink composition of claim 12, wherein the liquid vehicle is an aqueous vehicle.

22. The inkjet ink composition of claim 21, wherein the aqueous vehicle is water.

23. An inkjet ink composition comprising a) a liquid vehicle and b) a modified am pigment, wherein the modified azo pigment is the reaction product of at least one first diazonium reagent, at least one second diazonium reagent, and at least one azo coupler, and wherein the modified azo pigment forms a stable dispersion in the liquid vehicle without a separate dispersant.

24. An inkjet ink composition comprising a) a liquid vehicle and b) a modified azo pigment, wherein the modified colored pigment is the reaction product at least one diazonium reagent, at least one first azo coupler, and at least one second azo coupler, and wherein the modified azo pigment forms a stable dispersion in the liquid vehicle without a separate dispersant.

* * * * *